(12) United States Patent
Ohno et al.

(10) Patent No.: US 7,236,381 B2
(45) Date of Patent: Jun. 26, 2007

(54) CURRENT BALANCING CIRCUIT

(75) Inventors: Tsunehiro Ohno, Kawasaki (JP);
Shigeharu Yamashita, Kawasaki (JP);
Kazuhiko Itakura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/341,890

(22) Filed: Jan. 30, 2006

(65) Prior Publication Data

US 2006/0203524 A1    Sep. 14, 2006

(30) Foreign Application Priority Data

Mar. 14, 2005    (JP) .............................. 2005-071401

(51) Int. Cl.
*H02M 3/24* (2006.01)
(52) U.S. Cl. ........................................ 363/95
(58) Field of Classification Search .................. 363/20, 363/21.01, 55, 95, 97, 131
See application file for complete search history.

(56) References Cited

U.S. PATENT DOCUMENTS 4,912,621 A    3/1990    Kobayashi et al.

5,495,164 A  *  2/1996    Heng ........................ 323/222

FOREIGN PATENT DOCUMENTS

| DE | 10 2004 003 963 | 8/2004 |
|---|---|---|
| EP | 0 593 257 | 4/1994 |
| JP | 1-222659 | 9/1989 |
| JP | 04-026316 | 1/1992 |
| JP | 2001-161063 | 6/2001 |

OTHER PUBLICATIONS

European Search Report and Annex dated Aug. 17, 2006 of Application No. EP 06 25 0414.

* cited by examiner

*Primary Examiner*—Adolf Berhane
(74) *Attorney, Agent, or Firm*—Staas & Halsey LLP

(57) ABSTRACT

There is disclosed a current balancing circuit for use in a switching power supply unit that operates in parallel with one or more other switching power supply units with current balancing terminals connected to each other. The current balancing circuit comprises a first resistor that receives a detection signal of the output current input via a diode and outputs an output current detection voltage; a second resistor connected between the current balancing terminal and a connection point between the first resistor and the diode; an operational amplifier that outputs a signal corresponding to the different between the output current detection voltages; and a switching circuit.

2 Claims, 7 Drawing Sheets

POWER SOURCE OPERATED:SW1 ON
STOPPED:SW1 OFF

CURRENT BALANCING CIRCUIT

BACKGROUND OF THE INVENTION

1. Field of the Invention

The present invention relates to a current balance circuit for use in a switching power supply unit, adapted to control a balance between a current of the switching power supply unit and a current of one or more switching power supply units connected in parallel to the switching power supply unit so as to apply a stable voltage to a load.

2. Description of the Related Art

It was common to use a single power supply unit in order to supply a stable operating voltage to various types of electronic apparatuses, such as computers. Recently, however, the use of plural small power supply units operating in parallel has been increasing in view of size reduction and improved reliability of the power supply units. In general, switching power supply units are used as the small power supply units so as to stabilize output voltage. The use of the small switching power supply units operating in parallel allows stable voltage supply to a load even when one of the switching power supply units fails. This is because the other switching power supply units can make up for the failed switching power supply unit. The size reduction and reliability improvement of the power supply units are thus achieved.

FIG. 4 shows a configuration of a system in which n units of switching power supply units CONV1, CONV2, . . . CONVn are connected in parallel so as to apply a stable voltage to a load. In the case where one of the switching power supply units becomes unable to supply power to the load due to a failure, n-1 units of the switching power supply units continue to supply power. If the switching power supply units CONV1–CONVn have capacity to supply more power, the switching power supply units operating normally can maintain the power supply to the load even when two or more switching power supply units fail. In FIG. 4, Vin+ and Vin− indicate input voltages, Vout+ and Vout− indicate output voltages, and CB represents a current balancing terminal. The current balancing terminals CB are connected to each other so as to compare output current values of the switching power supply units CONV1–CONVn, thereby balancing output currents of the switching power supply units CONV1–CONVn.

FIG. 5 is a block diagram illustrating a related-art switching power supply unit. The power supply unit comprises a transformer 51, a rectifier circuit 52, a smoothing circuit 53, an output voltage detection circuit 54, an output current detection circuit 55, a current balancing circuit 56, a control circuit 57, a switching transistor Q1, and a current balancing terminal CB. Vin and Vout indicate an input voltage and an output voltage, respectively. When two or more of such a switching power supply unit operate in parallel, the current balancing terminals CB of the power supply units are connected to each other as described above.

The control circuit 57 controls switching operations of the switching transistor Q1 connected to a primary winding of the transformer 51. An induced voltage generated in a secondary winding of the transformer 51 is rectified by the rectifier circuit 52, smoothed by the smoothing circuit 53, and then output as the output voltage Vout. The output voltage Vout is applied to a load. The output voltage detection circuit 54 detects the output voltage Vout so as to input the output voltage Vout to the control circuit 57. The control circuit 57 controls the period during which the switching transistor Q1 is turned on so as to adjust the output voltage Vout to a predetermined level, thereby stabilizing the output voltage Vout. Also, a detection value detected by a current transformer or a resistor is input to the output current detection circuit 55 such that the output current detection circuit 55 detects an output current and inputs an output current detection signal to the current balancing circuit 56. Information about output currents of other switching power supply units operating in parallel are input to the current balancing circuit 56. The current balancing circuit 56 inputs a control signal for the output current to the control circuit 57 so as to balance the output currents of the switching power supply units.

FIG. 6 is a circuit diagram illustrating the current balancing circuit 56. The current balancing circuit 56 comprises resistors R1–R4, Ra, and Rb, a diode D1, and an operational amplifier OPA. The output current detection circuit 55 of FIG. 5 inputs the output current detection signal to the diode D1. The operational amplifier OPA inputs the control signal to the control circuit 57. The output current detection signal is input to the resistor Rb via the diode D1, so that an output current detection voltage V1 corresponding to the output current detection signal is generated across the resistor Rb. The output current detection voltage V1 is applied to a negative terminal of the operational amplifier OPA via the resistor R2, and is also applied to a positive terminal of the operational amplifier OPA as a voltage drop across the resistor R3 formed by the resistors Ra, R1, and R3. The current balancing terminal CB is connected to a connection point between the resistors Ra and R1. It is to be noted that the relationship between resistances of the resistors R1, R3, Ra, and Rb connected to the positive terminal of the operational amplifier OPA is R1+R3>Ra+Rb. Accordingly, the operational amplifier OPA inputs the difference between the output current detection voltage V1 and an output current detection voltage from the other current balancing circuits to the control circuit 57.

When two or more of the above described switching supply units operate in parallel with each other, the current balancing terminals CB of the switching power supply units are connected in parallel. If one of the switching power supply units has a higher output current detection voltage than the other, a signal for making the lower output current detection output voltage follow the higher output current detection voltage is input to a control circuit 57 from an operational amplifier OPA in the switching power supply unit having the lower output current detection voltage so as to balance the currents. In the switching power supply unit having the higher output current detection voltage, a signal for reducing the difference between the voltages to fall below a predetermined value is input to a control circuit 57 from an operational amplifier OPA, thereby balancing the currents. That is, each of the switching power supply units adjusts the output currents to the same level, i.e., controls the current balance.

There is known a current balancing circuit as disclosed in, for example, Patent Document 1. According to Patent Document 1, the current balance is controlled by detecting currents of primary sides of transformers of plural switching power supply units, whose current balancing terminals are connected to each other, and then integrating the difference between values of the detected currents of the primary sides of the switching power supply units. There is also known a configuration as disclosed in, for example, Patent Document 2. According to Patent Document 2, currents of secondary sides of transformers of plural switching power supply units are detected. Current balancing terminals of the switching power supply units are connected to each other so as to limit the difference between the values of the detected currents of the secondary sides of the transformers of the switching power supply units, thereby preventing a sudden change in output current.

<Patent Document 1> Japanese Examined Patent Publication No. 6-26473

<Patent Document 2> Japanese Patent Laid-Open Publication No. 2001-161063

Referring back to FIG. 6, as the current balancing terminal CB of the switching power supply unit is connected in parallel to a current balancing terminals CB of other switching power supply units as shown in FIG. 4, the resistors Ra and Rb of the switching power supply units are connected in parallel to each other via the current balancing terminals CB. If one of the switching power supply units fails, the output current thereof becomes zero, so that the voltage V1 applied to the resistor Rb via the diode D1 of the current balancing circuit of the failed switching power supply unit becomes zero. As a result, electric potentials of the current balancing terminals CB of the current balancing circuits of the other switching power supply units are reduced by the resistors Ra and Rb connected in parallel, so that impedance of a current balance control system during normal operations is lowered, thereby significantly lowering the current balance properties.

For example, with reference to FIG. 7A, if one of the switching power supply units is a master power source (switching power supply unit whose output current detection voltage is slightly higher than output current detection voltages of the other switching power supply units), the other switching power supply units are slave power sources. The master power source and the slave power sources maintain balance between the currents in accordance with the increase of a load current, while operating with a predetermined current difference. However, if one of the switching power supply units fails, resistors Ra and Rb of the failed switching power supply unit are connected in parallel to resistors Ra and Rb of the other switching power supply units via the current balancing terminals CB connected in parallel as mentioned earlier, so that impedance of a current balance control system is lowered. Therefore, output currents of the slave power sources follow the increase of the output current of the master power source with delay, resulting in increasing the difference between the output currents. That is, current balance properties are lowered.

SUMMARY OF THE INVENTION

The present invention may solve at least one problem described above.

Further, the present invention may prevent lowering of current balance proprieties with a simple structure.

According to an aspect of the present invention, there is provided a current balancing circuit for use in a switching power supply unit that operates in parallel with one or more other switching power supply units with current balancing terminals connected to each other so as to apply a stable voltage to a load, adapted to control a balance between output currents by comparing output current detection voltages of the switching power supply units. The current balancing circuit comprises a first resistor that receives a detection signal of the output current input via a diode and outputs the signal as an output current detection voltage; a second resistor connected between the current balancing terminal and a connection point between the first resistor and the diode; an operational amplifier that receives an output current detection voltage, which is applied to the current balancing terminal from a balancing circuit of the other one or more switching power supply units, via a connection point between the second resistor and the current balancing terminal and an input resistor, and receives the output current detection voltage from the first resistor via the connection point between the first resistor and the diode and an input resistor, so as to output a signal corresponding to the different between the output current detection voltage applied from the balancing circuit of the other one or more switching power supply units and the output current detection voltage from the first resistor; and a switching circuit.

It is preferable that the switching circuit disconnect the second resistor from the current balancing terminal in response to a failure detection signal.

It is also preferable that the switching circuit disconnect the first resistor from ground in response to a failure detection signal.

It is also preferable that the above-describe current balancing circuit further comprise a determination circuit that monitors one or more of an input voltage, an input current, an output voltage, an output current, temperatures of components of the switching power supply unit, operational states of the components of the switching power supply unit, and the output current detection voltage of the current balancing terminal, and outputs the failure detection signal upon detection of an abnormality so as to control the switching circuit.

According to the above-described aspect of the present invention, if one of the power supply units operating in parallel fails, lowering of the impedance of a current balance control system of the failed power supply unit is prevented by disconnecting the first and second resistors from the current balancing terminal in response to the failure detection signal.

DETAILED DESCRIPTION OF THE PREFERRED EMBODIMENT

First Embodiment

Figure 1:
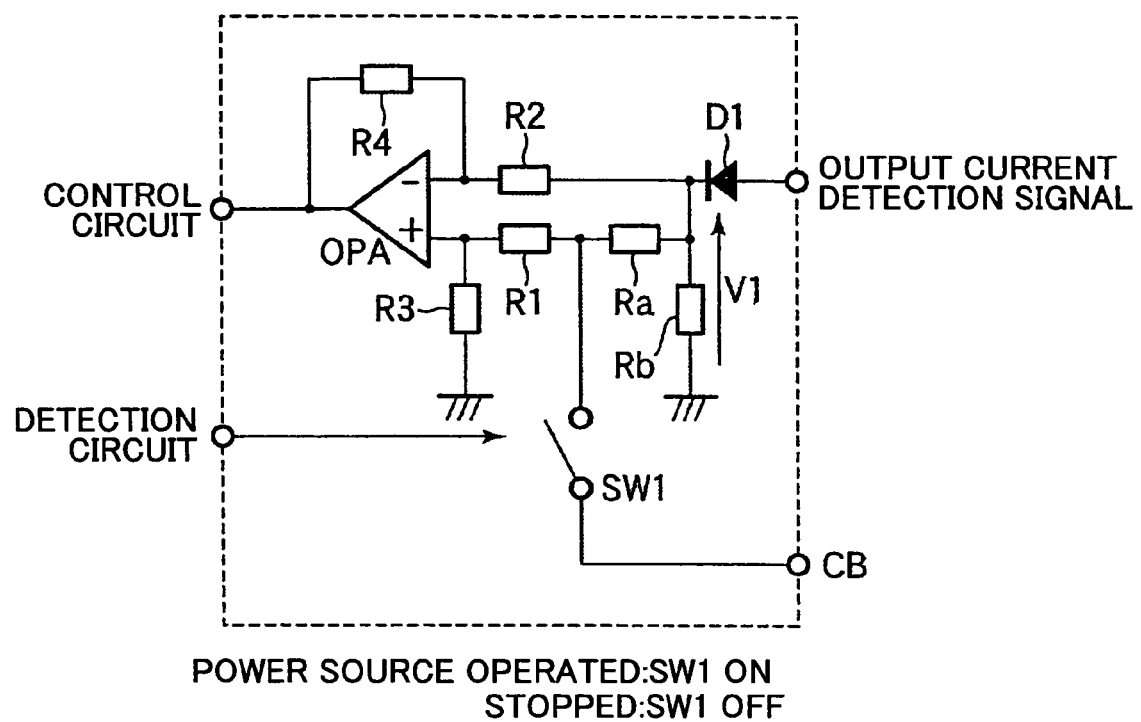
FIG. 1 is a circuit diagram illustrating a current balancing circuit according to a first embodiment of the present invention.

FIG. 1 is a circuit diagram illustrating a current balancing circuit according to a first embodiment of the present invention. The current balancing circuit comprises an operational amplifier OPA, resistors R1–R4, first and second resistors Ra and Rb, a diode D1, a switching circuit SW1, and a current balancing terminal CB. The first resistor Rb receives an output current detection signal input via the diode D1 and outputs the signal as an output current detection voltage v1. The second resistor Ra is connected between the current balancing terminal CB and a connection point between the first resistor Rb and the diode D1. The operational amplifier OPA receives an output current detection voltage, which is applied to the current balancing terminal CB from another current balancing circuit, via a connection point between the second resistor Ra and the current balancing terminal CB and the input resistor R1, and receives the output current detection voltage V1 via a connection point between the first resistor Rb and the diode D1 and the input resistor R2, so as to output a signal corresponding to the different between the output current detection voltage applied to the current balancing terminal CB and the output current detection voltage V1. A switching circuit SW1 disconnects the second resistor Ra from the current balancing terminal CB in response to a failure detection signal from a detection circuit (not shown).

Figure 5:
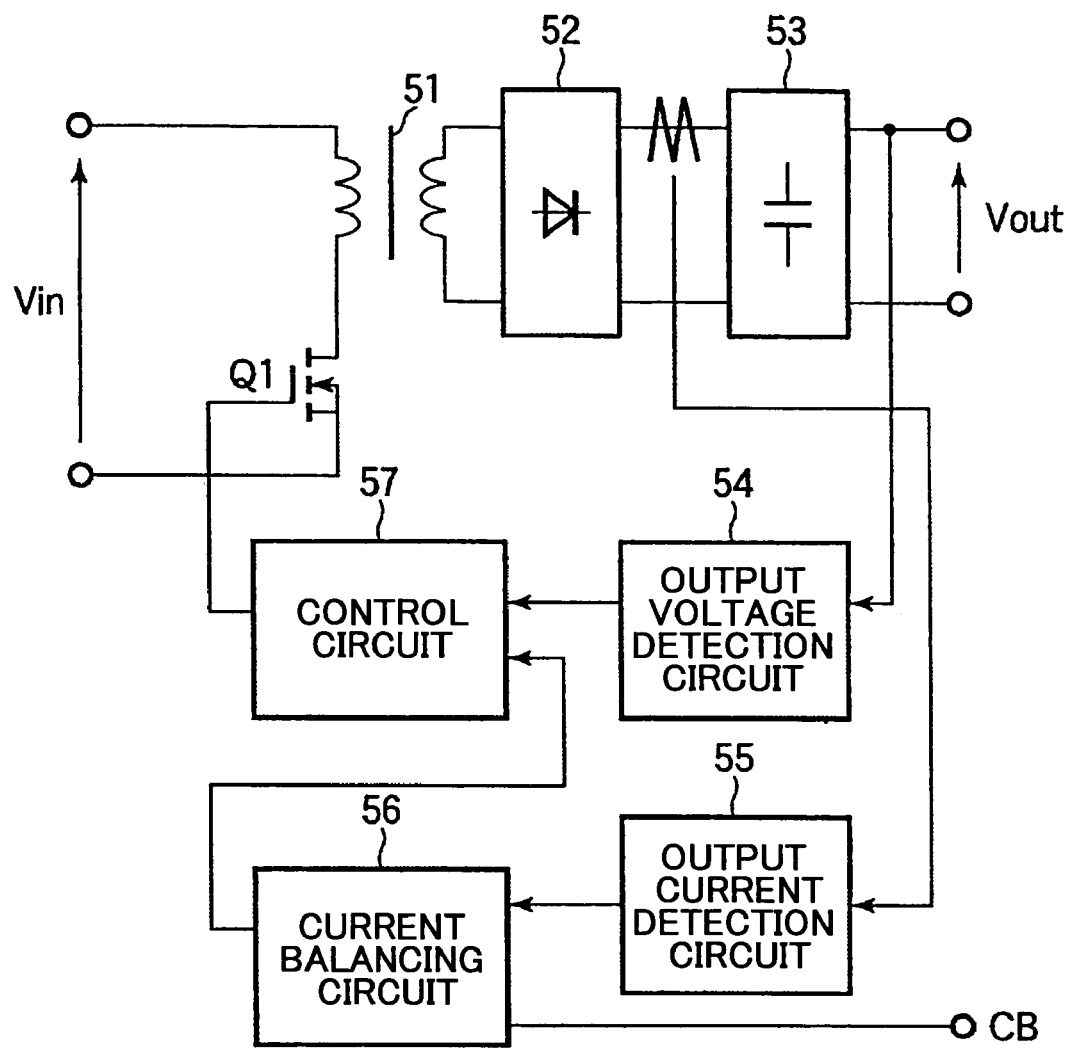
FIG. 5 is a block diagram illustrating a switching power supply unit according to a related art example.
Figure 6:
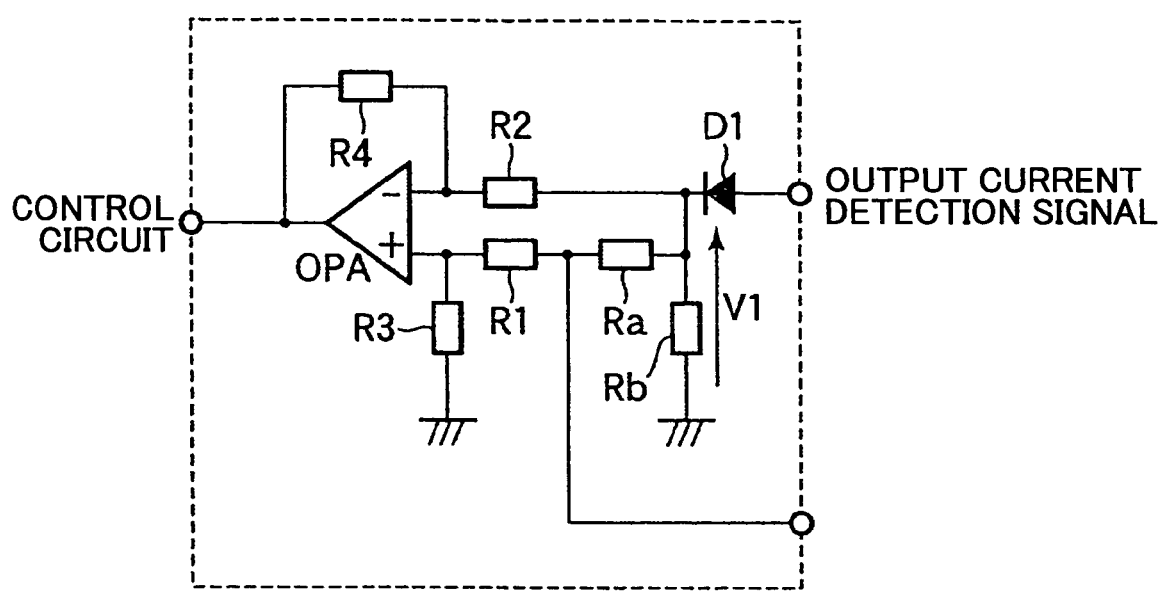
FIG. 6 is a circuit diagram illustrating a current balancing circuit according to a related art example.

A switching power supply unit has a configuration shown in, for example, FIG. 5. As described above, the output current detection signal from an output current detection circuit 55 is input to the first resistor Rb via the diode D1 and output as the output current detection voltage V1. The signal output from the operational amplifier OPA is input to a control circuit 57 that controls the switching on and off of a switching transistor Q1 connected to the primary side of a transformer 51. Although not shown, the detection circuit comprises detectors, such as a detector for detecting oscillation output signals from an oscillator used for switching control by the control circuit 57, a temperature sensor, and a malfunction detector, and generates a failure detection signal to switch off the switching circuit SW1.

Figure 7A:
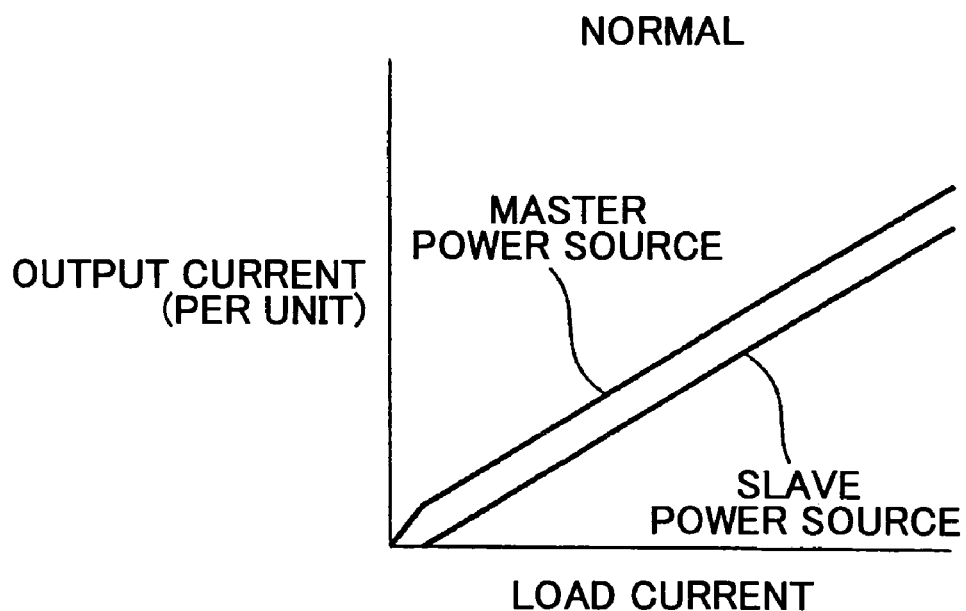
FIGS. 7A and 7B are charts illustrating current balance properties.
Figure 7B:
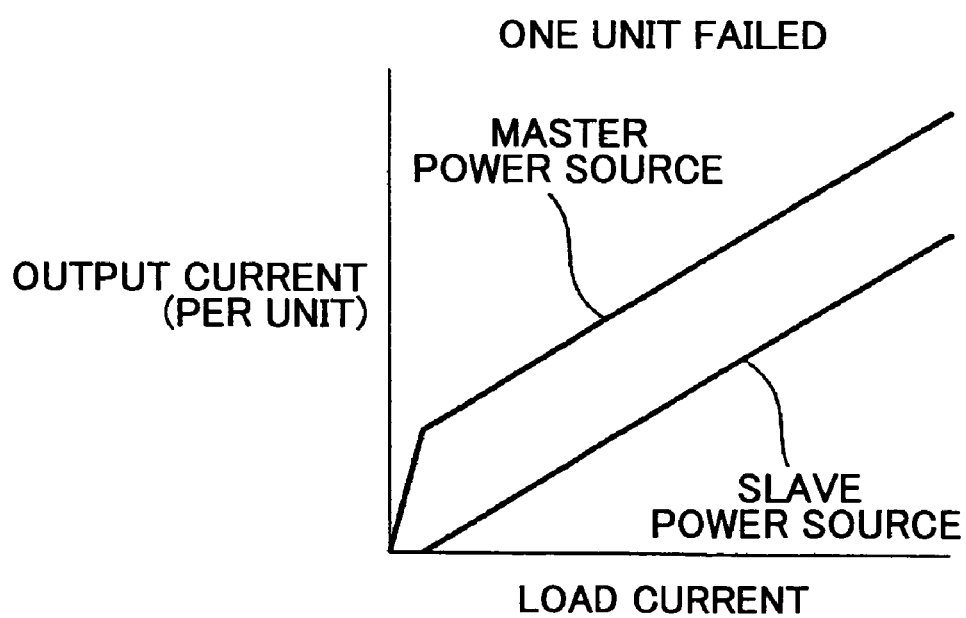

The switching circuit SW1 may have a mechanical connection point or may include a transistor. The switching circuit SW1 is switched on in response to a detection signal indicating the power source is operating normally, and is switched off in response to a failure detection signal generated when the power source stops. Accordingly, the current balancing terminal CB is connected to a current balancing terminal CB of another switching power supply unit while the power source operates normally. On the other hand, when the power source stops, the switching circuit SW1 is switched off, thereby disconnecting the resistors Ra and Rb from the current balancing terminal CB to prevent lowering of the impedance with respect to the current balancing circuit of the switching current power supply unit operating normally. That is, a current balance control system of a failed switching current power supply unit is disconnected from a current balance control system of a switching current power supply unit operating normally, so that output current properties of a master power source and a slave power source can maintain current balance properties the same as those during normal operations as shown in FIG. 7A.

Second Embodiment

Figure 2:
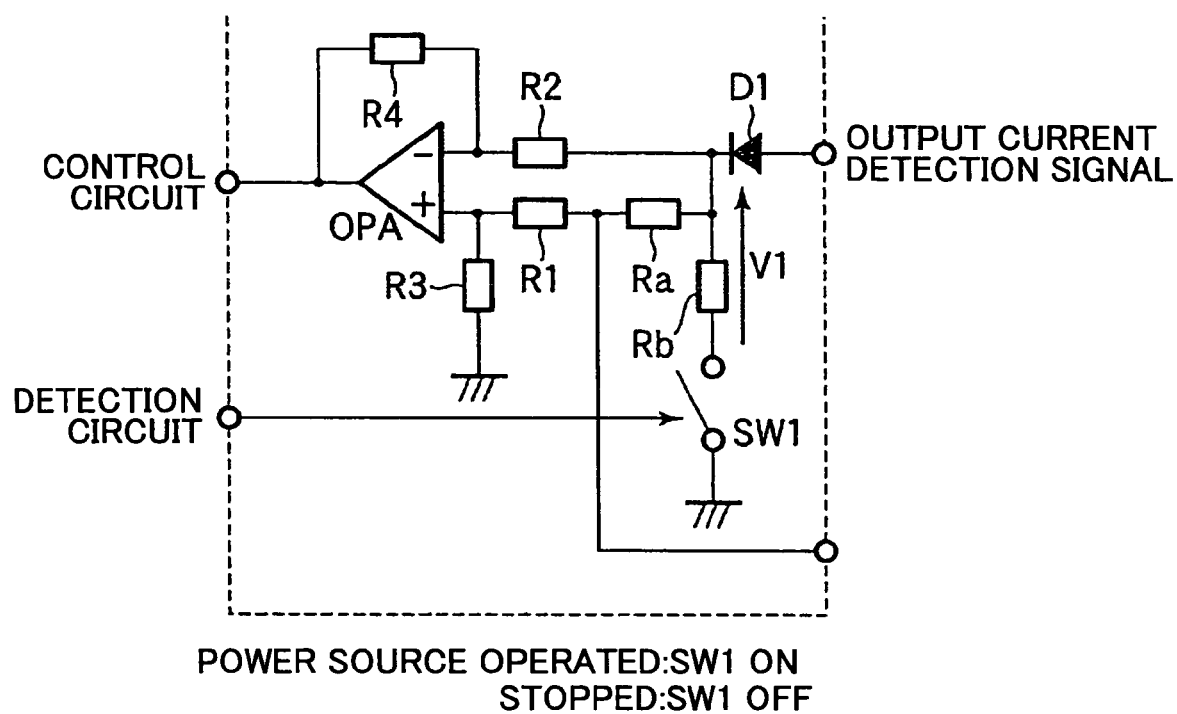
FIG. 2 is a circuit diagram illustrating a current balancing circuit according to a second embodiment of the present invention.

FIG. 2 is a circuit diagram illustrating a current balancing circuit according to a second embodiment of the present invention, wherein elements identical to those in FIG. 1 bear the same reference numbers. In the second embodiment, a switching circuit SW1 connects and disconnects a first resistor Rb to and from ground. The switching circuit is turned off in response to detection of a power failure, and is turned on when the power source operates normally. As in the first embodiment, while the power source operates normally, the switching circuit SW1 remains on so as to control the current balance. When a detection circuit detects a power failure, the switching circuit SW1 is turned off so as to disconnect the second and first resistors Ra and Rb from ground, thereby preventing lowering of the impedance of a current balance control system. Although a current balancing terminal CB is grounded via resistors R1 and R3, that has little effect on the lowering of the impedance of the current balance control system because the resistors R1, R3, Ra, and Rb have a relationship of R1+R3>Ra+Rb.

Third Embodiment

Figure 3:
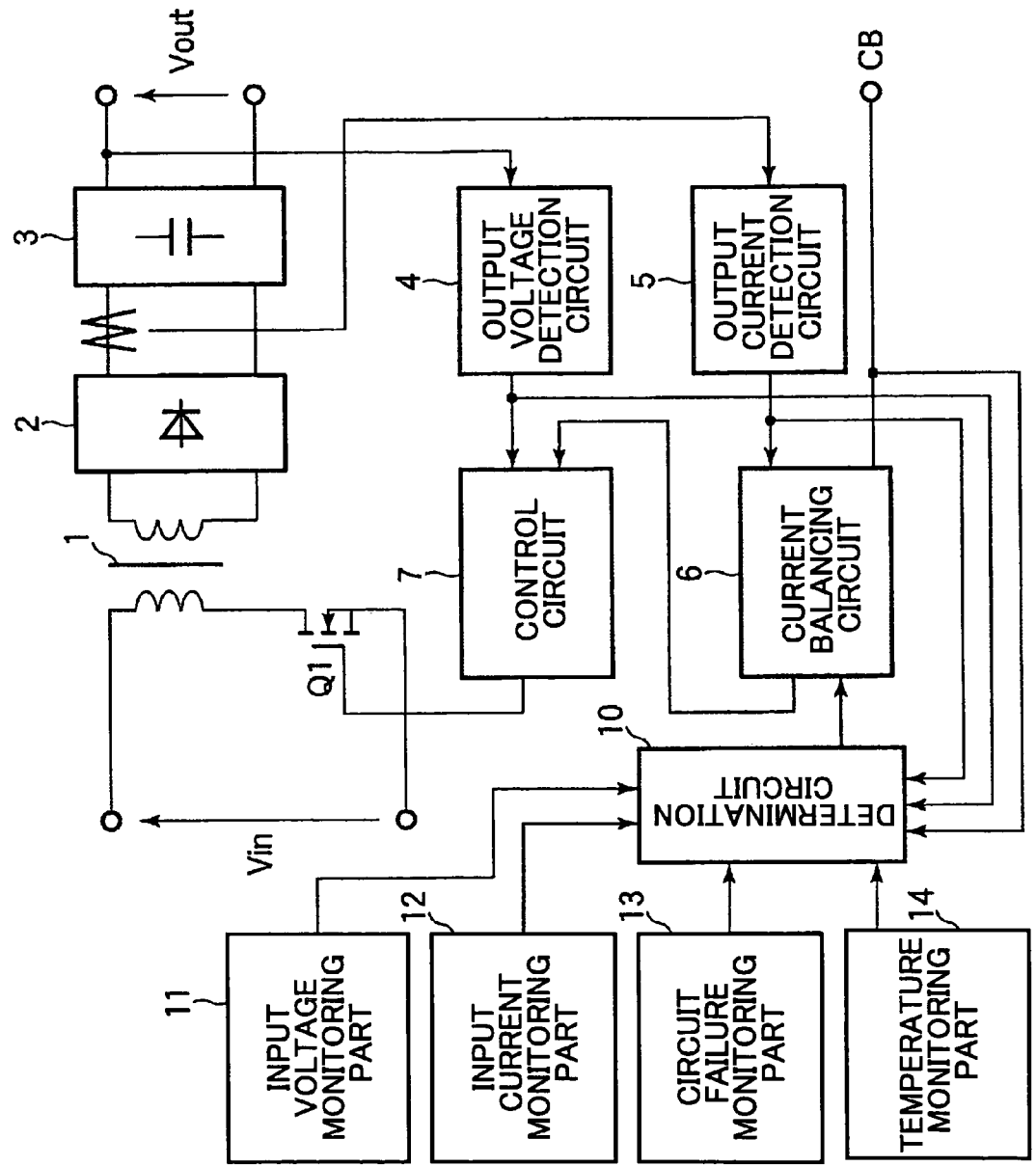
FIG. 3 is a block diagram illustrating a switching power supply unit according to a third embodiment of the present invention.
Figure 4:
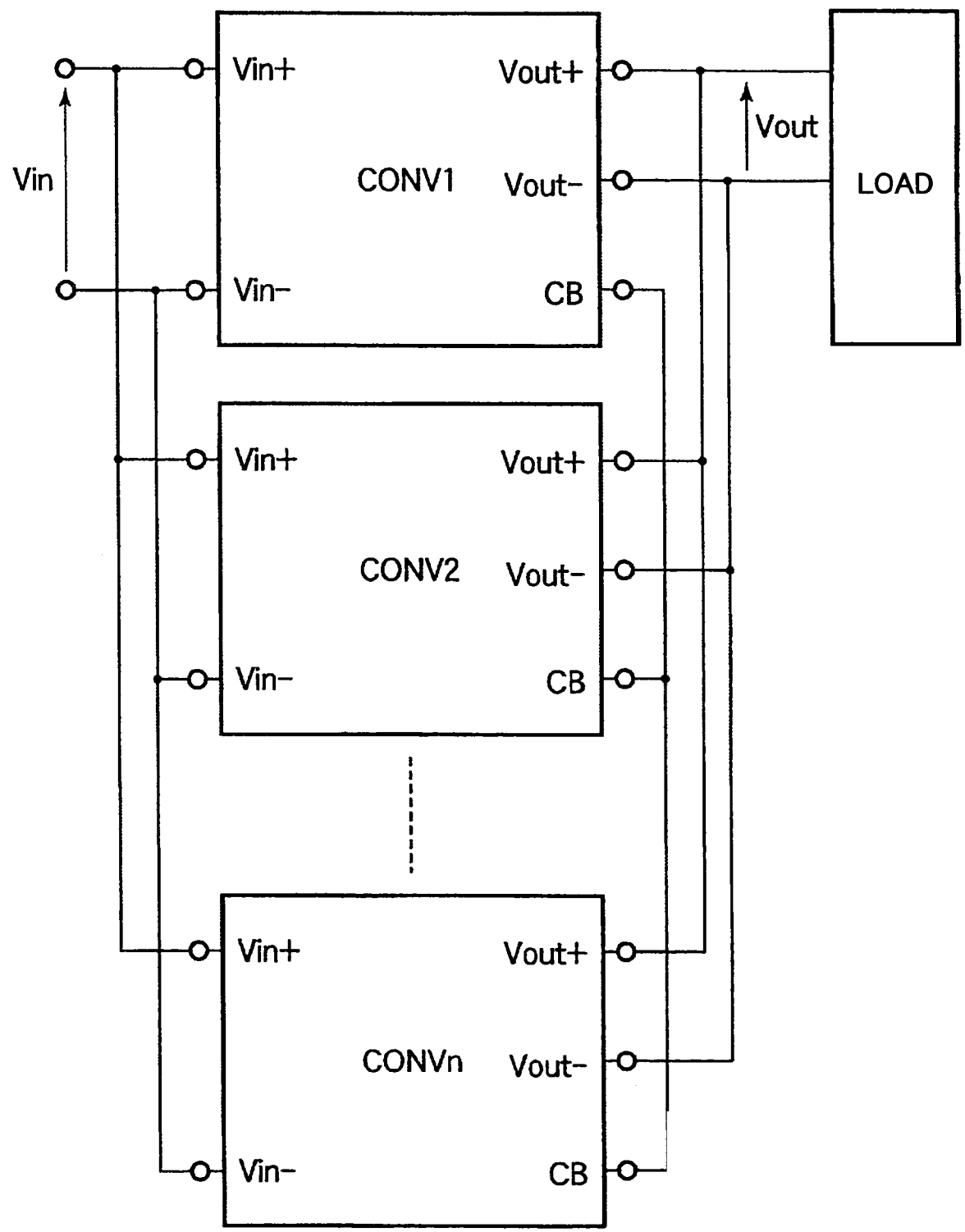
FIG. 4 is a block diagram illustrating switching supply units operating in parallel.

FIG. 3 is a block diagram illustrating a switching power supply unit according to a third embodiment of the present invention. The power supply unit comprises a transformer 1, a rectifier circuit 2, a smoothing circuit 3, an output voltage detection circuit 4, an output current detection circuit 5, a current balancing circuit 6, a control circuit 7, a determination circuit 10, an input voltage monitoring part 11, an input current monitoring part 12, a circuit failure monitoring part 13, a temperature monitoring part 14, a switching transistor Q1, and a current balancing terminal CB. Vin and Vout indicate an input voltage and an output voltage, respectively. The current balancing circuit 6 may have the configuration shown in FIG. 1 or the configuration shown in FIG. 2.

The input voltage Vin is applied to the transformer 1. The control circuit 7 controls switching operations of the switching transistor Q1 connected to a primary winding of the transformer 1. An induced voltage generated in a secondary winding of the transformer 1 is rectified by the rectifier circuit 2, smoothed by the smoothing circuit 3, including a capacitor, and then output as the output voltage Vout. The output voltage Vout is applied to a load (not shown). The output voltage detection circuit 4 detects the output voltage Vout so as to input the output voltage Vout to the control circuit 7. The control circuit 7 controls the period during which the switching transistor Q1 is turned on so as to adjust the output voltage Vout to a predetermined voltage, thereby stabilizing the output voltage Vout. Also, a detection value detected by a current transformer or a resistor is input to the output current detection circuit 5. The output current detection circuit 55 detects an output current and inputs an output current detection signal to the current balancing circuit 6. Information about an output current of another switching power supply unit operating in parallel is input to the current balancing circuit 6. The current balancing circuit 6 inputs a control signal corresponding to the output currents to the control circuit 7 so as to balance the output currents of the switching power supply units.

The input voltage monitoring part 11 inputs a detection signal to the determination circuit 10 when the input voltage Vin falls below a predetermine value or when the input voltage is interrupted. The input current monitoring part 12 detects an anomaly of an input current flowing through the primary winding of the transformer 1, and inputs a detection signal to the determination circuit 10. The circuit failure monitoring part 13 detects malfunction of the components, and inputs a detection signal to the determination circuit 10. The temperature monitoring part 14 detects abnormal temperature rise in circuits of the individual components, and inputs a detection signal to the determination circuit 10. A detection signal of the output voltage Vout or a detection signal of an abnormal increase of the output voltage Vout from the output voltage detection circuit 4 is input to the determination circuit 10. A detection signal of the output current or a detection signal of an overcurrent from the output current detection circuit 5 is input to the determination circuit 10. A current balance control signal from the current balancing terminal CB is also input to the determination circuit 10.

The determination circuit 10 determines whether there is a failure based on the detection signals input thereto. If the determination circuit 10 determines that there is a failure, the determination circuit 10 controls the current balancing circuit 6 so as to switch off a switching circuit SW1 shown in FIG. 1 or FIG. 2. Thus, the impedance inside from the current balancing terminal CB is increased, so that lowering of the impedance of a current balance control system of the switching power supply unit operating normally is prevented, thereby maintaining good current balance properties.

The present application is based on Japanese Priority Application No. 2005-071401 filed on Mar. 14, 2005, with the Japanese Patent Office, the entire contents of which are hereby incorporated by reference.

What is claimed is:

1. A current balancing circuit for use in a switching power supply unit that operates in parallel with one or more other switching power supply units with current balancing terminals connected to each other so as to apply a stable voltage to a load, adapted to control a balance between output currents by comparing output current detection voltages of the switching power supply units, comprising:

a first resistor that receives a detection signal of the output current input via a diode and outputs the signal as an output current detection voltage;

a second resistor connected between the current balancing terminal and a connection point between the first resistor and the diode;

an operational amplifier that receives an output current detection voltage, which is applied to the current balancing terminal from a balancing circuit of the other one or more switching power supply units, via a connection point between the second resistor and the current balancing terminal and an input resistor, and receives the output current detection voltage from the first resistor via the connection point between the first resistor and the diode and an input resistor, so as to output a signal corresponding to a difference between the output current detection voltage applied from the balancing circuit of the other one or more switching power supply units and the output current detection voltage from the first resistor; and a switching circuit configured to increase an inside impedance as viewed from the current balancing terminal by disconnecting the second resistor from the current balancing terminal in response to a failure detection signal or by disconnecting the first resistor from ground in response to the failure detection signal.

2. The current balancing circuit as claimed in claim 1, further comprising:

a determination circuit that monitors one or more of an input voltage, an input current, an output voltage, an output current, temperatures of components of the switching power supply unit, operational states of the components of the switching power supply unit, and the output current detection voltage of the current balancing terminal, and outputs the failure detection signal upon detection of an abnormality so as to control the switching circuit.

* * * * *